United States Patent [19]
Lau et al.

[11] Patent Number: 6,000,013
[45] Date of Patent: Dec. 7, 1999

[54] METHOD AND APPARATUS FOR CONNECTING MEMORY CHIPS TO FORM A CACHE MEMORY BY ASSIGNING EACH CHIP A UNIQUE IDENTIFICATION CHARACTERISTIC

[75] Inventors: Simon Lau, Fremont; Pradip Banerjee; Atul V. Ghia, both of San Jose, all of Calif.

[73] Assignees: Sony Corporation, Tokyo, Japan; Sony Electronics, Inc., Park Ridge, N.J.

[21] Appl. No.: 08/689,875

[22] Filed: Aug. 15, 1996

Related U.S. Application Data

[63] Continuation of application No. 08/336,550, Nov. 9, 1994, abandoned.

[51] Int. Cl.$^6$ .............................. G06F 12/00; G06F 13/00
[52] U.S. Cl. ......................... 711/119; 711/118; 711/120; 711/153; 711/154
[58] Field of Search ....................... 364/DIG. 1, DIG. 2, 364/243.4; 395/445, 446, 447, 480; 711/118, 119, 120, 153, 154

[56] References Cited

U.S. PATENT DOCUMENTS

| | | | |
|---|---|---|---|
| 4,831,625 | 5/1989 | Chiu et al. | 371/51 |
| 4,903,299 | 2/1990 | Lee et al. | 380/25 |
| 5,014,195 | 5/1991 | Farrell et al. | 395/455 |
| 5,056,002 | 10/1991 | Watanabe | 395/446 |
| 5,097,409 | 3/1992 | Schwartz et al. | 395/446 |
| 5,146,573 | 9/1992 | Sato et al. | 395/416 |
| 5,175,833 | 12/1992 | Yarkoni | 395/446 |
| 5,202,968 | 4/1993 | Sato | 395/447 |
| 5,210,844 | 5/1993 | Shimura et al. | 395/480 |
| 5,276,832 | 1/1994 | Holman, Jr. | 395/446 |
| 5,297,268 | 3/1994 | Lee et al. | 395/491 |

FOREIGN PATENT DOCUMENTS

| | | | |
|---|---|---|---|
| 0 325 420 A3 | 1/1989 | European Pat. Off. | G06F 12/00 |
| 0 335 113 A3 | 2/1989 | European Pat. Off. | G06F 12/08 |

*Primary Examiner*—Tuan V. Thai
*Attorney, Agent, or Firm*—Blakely, Sokoloff, Taylor & Zafman LLP

[57] ABSTRACT

The present invention includes a central processing unit (CPU) coupled to a bus. Cache memory devices are coupled to the bus to receive memory requests from the CPU. Each of the cache memory devices includes a cache memory which is coupled to the controller circuit. The controller circuit provides control signals, which enable the cache memory to execute a memory operation requested by the CPU. The controller circuit is coupled to receive predefined address bits comprising memory addresses and memory requests issued by the CPU. Each of the controller circuits disposed in each cache memory device is further coupled to receive an identification number unique to each of the cache memory devices coupled to the bus. The controller circuits disposed in each of the cache memory devices compares the unique identification number with the predefined address bits, such that if the identification number and the predefined address bits match, the controller circuit provides control signals to enable its cache memory to execute the memory operation requested by the CPU at the cache memory location corresponding to the main memory address. In the event the identification does not match the predefined bits of the address, the memory controller circuit does not provide control signals to enable the memory to execute the memory operation and disables output driver circuits disposed within the cache.

13 Claims, 4 Drawing Sheets

ID # [3:0]

| | | | | | |
|---|---|---|---|---|---|
| 1 CHIP SYSTEM | 0 0 0 0 | →  CHIP 0 |
| 4 CHIP SYSTEM | 0 1 0 0 | →  CHIP 0 |
| | 0 1 0 1 | →  CHIP 1 |
| | 0 1 1 0 | →  CHIP 2 |
| | 0 1 1 1 | →  CHIP 3 |
| 2 CHIP SYSTEM | 1 1 0 0 | →  CHIP 0 |
| | 1 1 0 1 | →  CHIP 1 |

FIG. 4

METHOD AND APPARATUS FOR CONNECTING MEMORY CHIPS TO FORM A CACHE MEMORY BY ASSIGNING EACH CHIP A UNIQUE IDENTIFICATION CHARACTERISTIC

This is a continuation of application Ser. No. 08/336,550 filed Nov. 9, 1994, now abandoned.

BACKGROUND OF THE INVENTION

1. Field of the Invention

The present invention relates to memory systems, and more particularly, to a method and apparatus for addressing and accessing information in cache memories, which may be used in computer systems or other electronic devices.

2. Art Background

It is common in many data processing systems to utilize a high speed buffer memory, referred to as a "cache", coupled to a central processing unit (CPU) to improve the average memory access time for the processor. The use of a cache is based upon the premise that over time, a data processing system will frequently access certain localized areas of memory. The cache typically contains a subset of the complete data set disposed in the main memory, and it can be accessed very quickly by the CPU without the need for accessing main memory. If data and instructions are retrieved from main memory and are placed in cache memory as they are used by a program, and if the system looks first to the cache memory to determine if the information required is available there, then the system will often find the desired information in the cache memory and will, consequently, operate at a higher speed. A performance advantage is realized because statistically, information that has just been used in any particular portion of a process is more likely to be required immediately than is other information which has not been recently used.

The prior art teaches a variety of caching systems. In one type of caching system, both the cache memory devices and the CPU are coupled to a system bus. The CPU issues memory requests over the system bus to the cache memory. There is a "hit" when the requested data and/or instructions are found in the cache memory; in such a case, the information is fetched from the cache and sent over the system bus to the CPU. If the desired information is not found in the cache memory, it must be obtained from the main memory. The procedure for accessing the main memory is well-known in the art and will not be further described herein. Other systems utilize a similar approach wherein the CPU and the cache memory are located on a single semiconductor device ("chip").

One representative prior art system is illustrated in FIG. 1. As shown, a CPU 10 is coupled to a bus 12 for communication with a plurality of cache memories 14, 16, 18, and 20. Each of the cache memories is coupled to the bus 12 to permit the memories to receive memory operation requests from the CPU 10. A logic control circuit 22 is also coupled to the system bus 12 and to each of the cache memories, as shown in the figure. The logic control circuit 22 is also coupled to an output select multiplexor 24, as are data output lines 26, 28, 30, and 32 from each of the respective cache memories. In operation, the CPU 10 issues a memory request, such as a read or write request, in conjunction with a memory address; this procedure is well-known in the prior art. However, to avoid confusion and ambiguity in the system illustrated in FIG. 1, the logic control circuit 22 must provide a chip select signal ("CS") to the particular cache memory device to which the memory request is directed. Since each of the cache memories, 14, 16, 18, and 20 is coupled to the bus 12, each will sense the memory request and address sent by the CPU. The logic control circuit must sense the memory request and, depending upon the address of the request, enable the appropriate cache memory by issuing a chip select signal to the selected memory device. Thus, the logic control circuit 22 determines which of the cache memories will respond to a particular memory request issued by the CPU 10. The logic control circuit 22 enables the output select multiplexor 24 to couple the output of the responding cache memory to bus 12 for receipt by the CPU 10.

Together, the logic control circuit 22 and the output select multiplexor 24 are generally referred to as "glue logic". Glue logic reduces system performance by adding additional electronic delays in the system and adds to the cost of the memory system by requiring additional semi-conductor components.

As described, the present invention provides an improved cache memory system and a method which overcomes the limitations of the above-described prior art systems. The present invention achieves greater cache memory sizes through the use of cascaded cache memory devices without the performance degradation introduced by external glue logic circuitry previously required by prior art methods.

SUMMARY OF THE INVENTION

The present invention provides an improved cache memory system having particular application for use in data processing systems in which cache memory devices are cascaded to achieve greater cache memory size. The present invention includes a central processing unit (CPU) coupled to a bus. Cache memory devices are coupled to the bus to receive memory requests from the CPU. Each of the cache memory devices includes a cache memory which is coupled to the controller circuit. The controller circuit provides control signals, which enable the cache memory to execute a memory operation requested by the CPU. The controller circuit is coupled to receive predefined address bits comprising memory addresses and memory requests issued by the CPU. Each of the controller circuits disposed in each cache memory device is further coupled to receive an identification number unique to each of the cache memory devices coupled to the bus. The controller circuits disposed in each of the cache memory devices compares the unique identification number with the predefined address bits, such that if the identification number and the predefined address bits match, the controller circuit provides control signals to enable its cache memory to execute the memory operation requested by the CPU at the cache memory location corresponding to the main memory address. In the event the identification does not match the predefined bits of the address, the memory controller circuit does not provide control signals to enable the memory to execute the memory operation and disables output driver circuits disposed within the cache memory device, effectively resulting in the non-selected cache memory device providing no output to the bus. Accordingly, each of the cache memory devices independently determines whether or not a particular memory request is directed to a memory location disposed within its respective cache memory. The CPU is not required to identify which cache memory device the memory request is directed to, and moreover, all cache memory devices that are not selected are disabled by their respective controller circuits to ensure that they do not provide spurious signals over the bus which the CPU may receive and interpret incorrectly.

DESCRIPTION OF THE DRAWINGS

FIG. 4 illustrates one example of the present invention's use of binary identification numbers to select cache memory chips in accordance with the teachings of the present invention.

DETAILED DESCRIPTION OF THE INVENTION

An improved cache memory method and apparatus is disclosed having particular application for use by computer systems to improve memory access efficiency. In the following description for purposes of explanation, specific memories, organizations, architectures, data lines, address lines, etc. are set forth in order to provide a thorough understanding of the present invention. However, it will be apparent to one skilled in the art that the present invention may be practiced without these specific details. In other instances, well known circuits are shown in block diagram form in order not to obscure the present invention.

Figure 2:
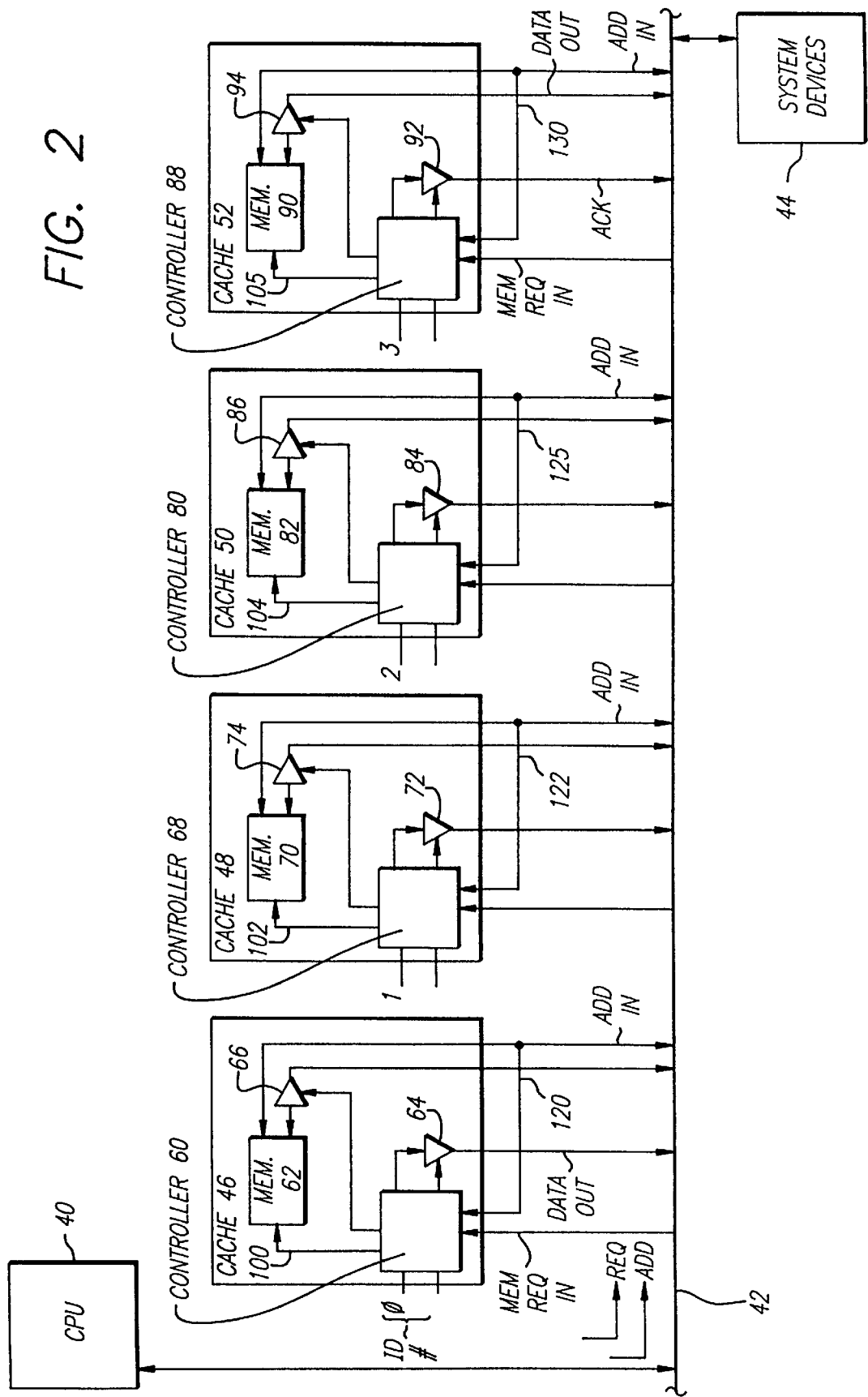
FIG. 2 is a simplified block diagram of the cache memory system of the present invention.

Referring now to FIG. 2, a generalized block diagram of the system of the present invention is shown. As illustrated, a central processing unit (CPU) 40 is coupled to a bus 42. The bus 42 may be a system bus, or alternatively, a local bus designed to handle high speed data transfers between the CPU 40 and cache memory. Various other system resources, such as system devices 44, are also coupled to the bus 42 for communication with the CPU 40. It will be noted that for purposes of this description, the bus 42 as well as the CPU 40 are shown in a simplified block diagram form for ease of understanding. It will appreciated by one skilled in the art that there are many additional components comprising the bus 42, the CPU 40, system devices 44 and other components illustrated in the drawings. In order to avoid unnecessarily obscuring the present invention, these components are not described in detail herein. As illustrated in FIG. 2, the present invention's cache memory includes cache memory devices 46, 48, 50 and 52 (hereinafter referred to as "cache memory chips"). Although the present invention is described with reference to four discrete cache memory chips coupled to bus 42, it will be appreciated by one skilled in the art that the teachings of the present invention may be employed in cache memory systems having less than, or greater than, the number of cache memory chips illustrated in the figures.

As shown in FIG. 2, each of the cache memory chips is structurally similar. For example, cache memory chip 46, includes a controller 60, which, as will be described, is coupled to a cache memory 62 and to output drivers 64 and 66. The controller 60 is also coupled to receive an identification number ("ID #") comprising, in the presently preferred embodiment, a two-bit binary number. Similarly, cache memory 48 includes a memory controller 68 which is coupled to a cache memory 70 and to output drivers 72 and 74. Cache chip 50 includes a cache controller 80 which is coupled to a cache memory 82 and two output drivers, 84 and 86. Finally, cache chip 52 includes a controller 88 which is coupled to a cache memory 90 and two output drivers, 92 and 94.

Continuing to refer to FIG. 2, the reader will note that each of the cache memory chips 46, 48, 50, and 52 are coupled to the bus 42 for communication with the CPU 40. As is common, the CPU 40 issues a memory access request in conjunction with a memory address. The specific timing and nature of the memory request and address signals are a function of the particular bus in which the present invention is utilized. Certain buses conform to standard bus specifications, such as the Intel Multi-Bus®, the IEEE-488 bus, or the M bus owned by Sun Microsystems, Inc. However, the present invention does not rely on any specific bus architecture and is intended to be utilized by a variety of different bus structures; therefore, no specific timing or signaling requirements are set forth in this Specification.

It is assumed that the CPU 40 issues a memory request which, in accordance with the teachings of the present invention, is received by each of the controllers (for example Controller 60) in each of the cache chips shown in FIG. 2. As previously noted, each of the cache chips utilized in the present invention is provided with a unique ID # to identify its location on bus 42. As will be described, each of the controllers disposed within the cache chips receives the memory request as well as the predefined address bits comprising the entire main memory address to be accessed for the memory operation initiated by the CPU 40.

As illustrated, each of the memory controllers disposed within the cache memory chips is coupled to the cache memories over a control line (for example, control lines 100, 102, 104, and 105) providing each of the respective cache memories with the enable and activation signals needed to control the memory read and write processes.

Figure 1:
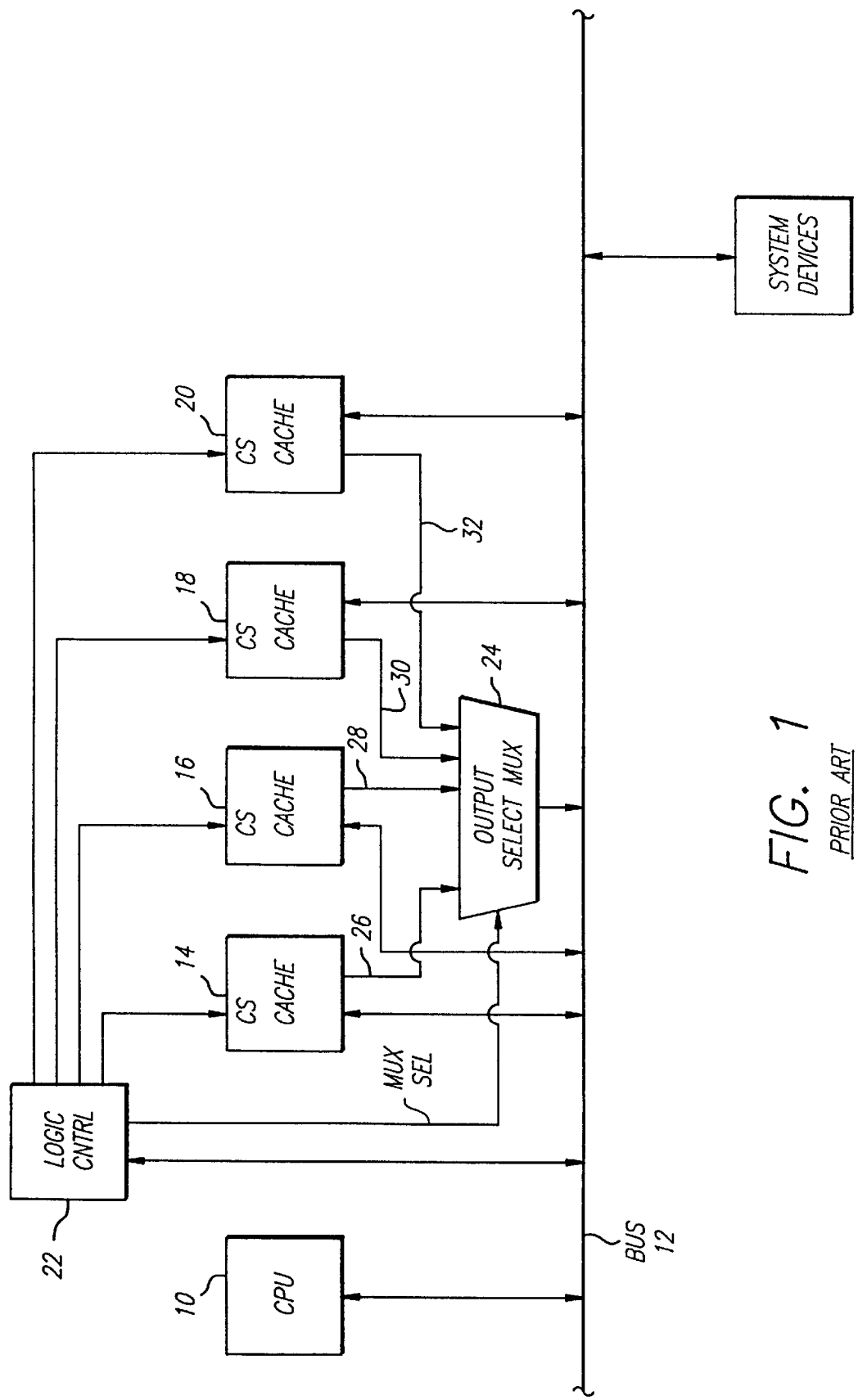
FIG. 1 is a block diagram of a prior art cascaded cache memory system.

The present invention overcomes the limitations of the prior art in particular, the prior art system illustrated in FIG. 1, by eliminating the requirement for external glue logic including the logic control circuitry and the output select multiplexor shown in FIG. 1. The present invention's use of an identification number for each of the cache chips, in conjunction with the selection of certain pre-defined address bits corresponding to memory address locations within each of the particular cache chips, permits high performance cache memory accessing unknown in the prior art.

The present invention provides each of the cache memories illustrated in FIG. 2 with the ability to identify memory requests, which are directed to memory address locations disposed within their particular cache memories, and to ignore memory requests directed to other cache memories coupled to bus 42. In accordance with the teachings of the present inventions, each of the cache chips is provided with a unique ID # in the form of a two-bit binary number coupled to each of the controllers within the cache chips. For example, a binary ID # of logical 0 is coupled to the controller 60 of the cache chip 46. Similarly, a binary one is coupled to controller 68 of the cache chip 48, a binary two is coupled to the controller 80 of cache chip 50, and a binary three is coupled to the controller 88 of the cache chip 52, as illustrated in FIG. 2. In the presently preferred embodiment, each of the identification numbers comprises static hard-wired inputs into the controller 60. Thus, each cache memory chip is provided with a static identification number, which is used to identify the particular cache memory chip, and which provides an input to the memory selection process for a memory request issued by the CPU 40.

In the present invention, the selection of a cache memory chip is dependent upon the ID # and the value of the predefined address bits comprising the main memory address provided by the CPU 40. In one implementation of the present invention, the main memory address memory space of the CPU 40 is divided into four regions, wherein each of the regions is pre-assigned to one of the four cache memory chips illustrated in FIG. 2. The regions may be contiguous or interleaved.

The operation of the present invention may be generally described as initiating upon memory request issued by the CPU 40. The memory request and the address of the main memory location to be accessed are provided over the bus 42 and are received by cache chip 46, cache chip 48, cache chip 50, and cache chip 52. The memory request is received by each of the controllers disposed in the respective cache chips, as is the address provided by the CPU. Certain pre-defined address bits are also provided over, for example, line 120 (see FIG. 2) to, for example, the controller 60. Similarly, for cache chip 48, the memory request is received by the controller 68, and certain pre-defined address bits are coupled to the controller 68 over line 122. In the case of cache chip 50, certain pre-defined address bits are coupled over line 125 to the controller 80, as is the case for cache chip 52 in which the pre-defined address bits are coupled over a line 130 to the controller 88.

As will be described in more detail with reference to FIG. 3, each of the controllers disposed within the respective cache chips compares the ID # with the address bits provided, and if the bits match, the controller disposed within the cache chip provides control signals to initiate the desired memory operation to access the cache memory disposed on the cache chip and to provide the output of the cache memory to bus 42 for receipt by CPU 40. In the event that a comparison between the identification number and the address bits does not result in a match, the output driver on the particular cache chip is disabled by the controller.

Assume for sake of example, that CPU 40 issues a memory request to an address space which has been allocated to cache memory chip 48. The memory request and address is coupled over the bus 42 and is received by each of the cache memory chips illustrated in FIG. 2. The memory request is coupled to controller 68 of the cache chip 48, as well as to each of the cache chips. If a comparison of the ID # (a binary one in the present example) and the address bits results in a match, controller 68 issues appropriate memory control commands over line 102 to the cache memory 70 to initiate the memory operation. In addition, the controller 68 enables the output driver 74 to couple any requested data or instructions fetched from the cache memory 70 to bus 42 for receipt by the CPU 40. Similarly, controller 68 enables the output driver 72 and issues an appropriate acknowledge signal, in accordance with the particular protocol of the bus in which the present invention is implemented. Other controllers such as controller 80 of cache memory 50 will determine that there is no match between the pre-defined address bits provided by the CPU and their particular identification number. Accordingly, controller 80 will disable the output driver 84 and the output driver 86, such that no output is provided from the cache chip 50 to the bus 42.

In a similar fashion, the controller 88 of cache chip 52 will disable the output driver 92 and the output driver 94 since the address provided by the CPU does not match with the identification number (a binary three) provided to the controller 88. Thus, without any external glue logic, each of the cache memory chips coupled to the bus 42 independently determines whether or not the memory request provided by the CPU 40 is destined for its particular cache memory. If the memory address corresponds to the memory space allocated to its particular cache memory, the cache memory chip's controller enables its cache memory and provides the requested data to the CPU 40 over the bus 42. However, if the controller determines that the memory request is not destined for its cache memory, the controller disables the output drivers of the cache memory chip, thereby resulting in the chip remaining quiet and not responding to the CPU memory request.

It will be noted by one skilled in the art that the CPU and each of the cache memory chips operate independently, in that the CPU 40 need not be informed by any signalling methodology how many cache memory devices are coupled to the bus 42. Rather, the CPU simply issues a memory request along with necessary address information, and each of the cache memory chips operate independently to either provide the requested data or to disable themselves such that they provide no output to the bus 42.

Referring once again to FIG. 2, in conjunction with FIGS. 3 and 4, the operation of the controller disposed within each of the respective cache chips will be described in more detail. Although the system illustrated in FIG. 2 comprises four cache chips coupled to the bus 42, it is contemplated that the present invention may be implemented in systems which use fewer than four cache memory chips. Accordingly, the present invention must also be capable of being used in systems having only one or two cache memory chips coupled to the bus 42. It will further be appreciated that although the present invention is illustrated and described with reference to a system having up to four cache memory chips, that the present invention may also be implemented in systems having additional cache memory chips. Illustrated in FIG. 3 is a block diagram of each of the respective controllers (for example controller 60) disposed on each of the respective cache memory chips (for example cache memory chip 46). For purposes of illustration, the description of the controller and its operation illustrated in FIG. 3 will be discussed with reference to controller 60 of the cache memory chip 46. However, it will be appreciated that the operation of controller 60 is similar to the operation of the other controllers 68, 80, and 88 illustrated in FIG. 2.

Figure 3:
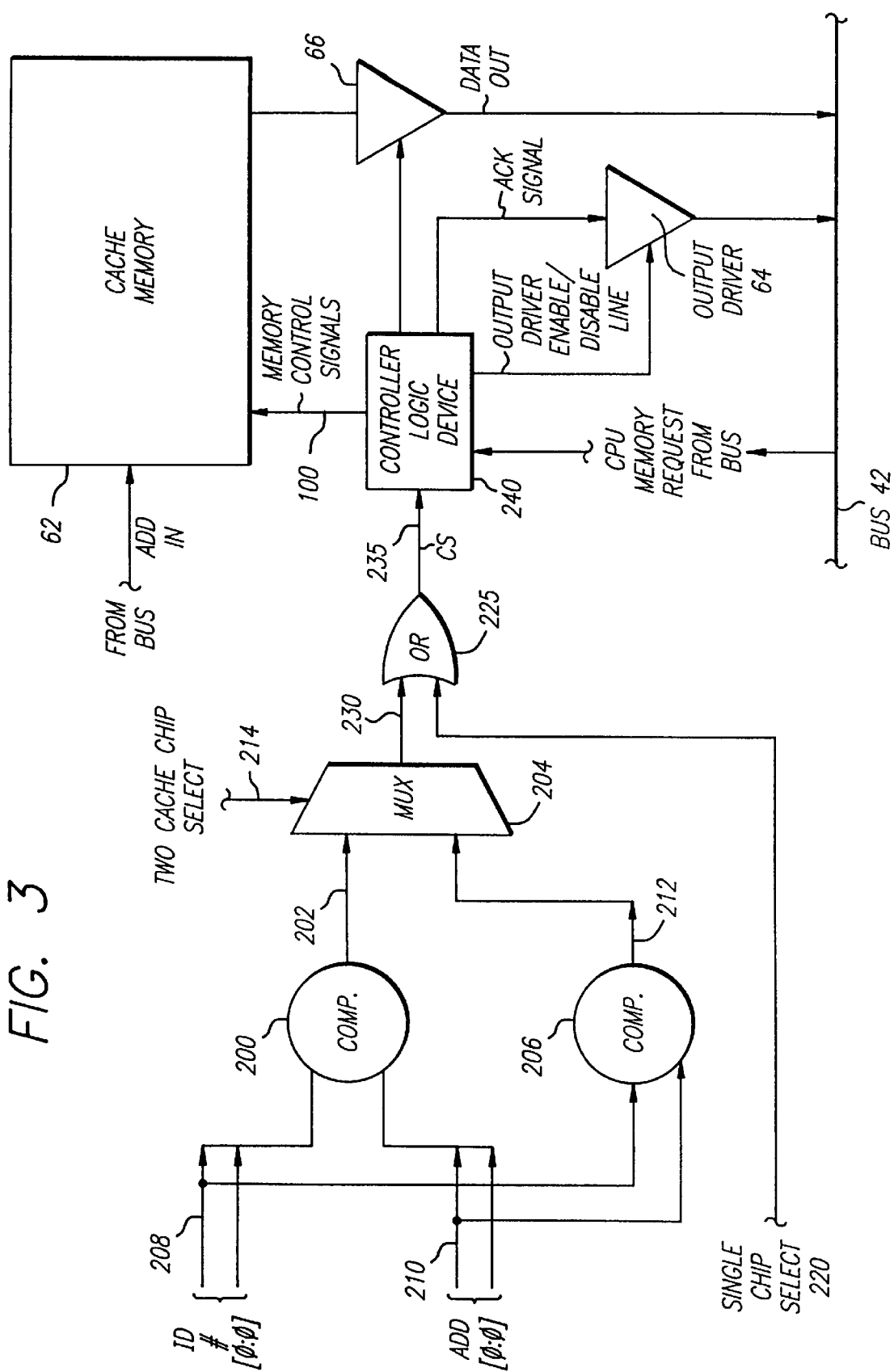
FIG. 3 is a more detailed block diagram of the present invention's cache memory control circuit, which provides greater cache memory size with minimum system degradation for cache memory accesses by the CPU.

Referring now to FIG. 3, a block diagram of the controller 60 is shown. The ID # is provided as a 2-bit static input (in the present example binary numbers 00) coupled to a comparator 200. As will be appreciated, if the 2-bit ID # number value and the 2-bit address value identically matches, comparator 200 will issue a "match" signal over line 202 to a multiplexor 204. The controller of the present invention is designed to accommodate the case where only two cache chips are coupled to the bus 42. In such event, only one identification bit need be sensed and compared to a single address bit. A comparator 206 is coupled to the least significant bit of the identification number identified generally by the line 208 in FIG. 3. Similarly, comparator 206 is coupled to only a single line 210 of the 2-bit address bits provided by the system of the present invention. In the event that the address bit coupled over line 210 matches the identification bit coupled over line 208, the comparator 206 issues a match signal on line 212 to the multiplexor 204. The multiplexor 204 is configured to select line 212 upon the activation of a two cache chip select line 214.

It is contemplated that the system designer will provide a mechanism for generating the two cache chip select signal, for example, by a jumper arrangement on a printed circuit board, although it is also possible in future systems that the signal may be generated under software control. Generally, in the event that only a single cache chip is used in a particular system environment, a single chip select line 220 is provided and is coupled to an input of an OR gate 225 as shown in FIG. 3. The output of multiplexor 204 is coupled to the OR gate 225 over line 230. In the presently preferred embodiment, the single chip select line 220 is "driven high" in the event that only a single cache chip is used, thereby always resulting in the generation of a chip select ("CS") signal over a line 235.

As illustrated in FIG. 3, the chip select line 235 is coupled to a controller logic device 240. The controller logic device 240 receives the memory request issued by the CPU 40 over the bus 42. In the event the controller logic device 240 receives a CPU memory request and a chip select signal over line 235, the controller logic device 240 issues memory control signals over line 100 to the cache memory 62. In addition, the controller logic device 240 enables output drivers 66 and 64 to provide both necessary acknowledge and other protocol signals over the bus 42 to the CPU 40, as well to provide any requested data from the cache memory 62 in accordance with the request from the CPU 40.

As the operation of memory, in particular cache memory is well known in the art, the specific signals issued by the controller logic device 240 to the cache memory 62, and the nature of the signals generated and driven by the output driver 64 are not discussed in further detail in this specification. Moreover, it will be appreciated by one skilled in the art, that the specific configuration of the output drivers in conjunction with the controller logic device 240 and the cache memory 62 may be modified to accommodate a variety of bus protocols and architectures.

It will be further appreciated that in the event the controller logic device 240 receives a memory request from the CPU 40 but does not receive a chip select signal over line 235, that the controller logic device 240 does not issue memory control signals over line 100, and actively disables the output drivers 66 and 64. Thus, in such an event the cache chip has not been selected and is therefore deemed to be in an inactive mode. The cache chip will remain in the inactive mode until the next memory request is received over the bus 42 and a chip select signal is received over line 235.

Referring now to FIG. 4, in conjunction with FIG. 3, the encoding for the preferred embodiment of the present invention as illustrated. The present invention's four bit identification number ("ID [3:0]") utilizes the convention that when four bits are "0", the system is utilizing only one cache memory chip, and the single chip select line 220 will be high. As illustrated in the Figure, if the ID # comprises the binary quantity 0100, a four cache memory chip implementation is utilized, wherein the last two bits ("00") correspond to the cache memory chip identification number, namely chip 0. Similarly, as shown in FIG. 4, the binary quantity 0101 indicates that the system of the present invention is utilizing four cache memory chips (as shown in FIG. 2) and the last two binary numbers 01 correspond to ID #1 for cache memory chip 48. In FIG. 4 for ease of understanding, a rectangular box has been drawn around the last two bits which correspond to the identification bit supplied as a static binary quantities to each of the cache memory chips.

As shown in FIG. 4, an ID # of 1100 identifies a two cache memory chip configuration such that the two cache chip select line 214 of FIG. 3 is activated, thereby selecting line 212 as the output of the multiplexor 204 on line 230. The last two bits ("00") of the quantity 1100 corresponds to ID #0 for the cache memory chip 46 shown in FIG. 2. Finally, an identification bit quantity 1101 identifies the system as a two cache chip system, thereby selecting line 214, and wherein, the last two bits (01) identify ID #1 to cache chip 48 in FIG. 2.

It will be appreciated by one skilled in the art, that the particular coding configuration described with reference to FIGS. 2 through 4 is a matter of design choice, and that multiple combinations and variations of encoding are possible in accordance with the teachings of the present invention.

It will further be noted by one skilled in the art, that although certain specified circuits and electronic block diagrams are shown in the figures, numerous other data paths, electrical blocks, etc. are required for operation of the circuit elements. However, the organization and structure of the present invention has been illustrated in this simplified manner in order to convey the operation of the present invention without unnecessary detail. For example, although the present invention has been described as being used in connection with a CPU providing memory requests, it is anticipated that other memory access devices may also provide such requests. In addition, although the present invention has been described as comparing a cache memory chip identification number with a portion of the received address, it will be appreciated that the present invention contemplates that other embodiments are possible. In its most general form, the present invention compares identification characteristics, such that if a first identification characteristic provided to a memory chip matches a second identification characteristic provided over the bus 42, the memory controller provider control signals to enable the memory device to execute the memory operation requested.

Accordingly, an improved cache memory organization and method has been disclosed. Although the present invention has been described with particular reference to the FIGS. 1 through 4, it will be apparent to one skilled in the art that the teachings of the present invention may be used in a variety of other computer memory applications. The invention should, therefore, be measured in terms of the following claims.

We claim:

1. A memory system comprising:
   a main memory;
   a plurality of cache memory devices coupled to a common bus, each having an identifier, each cache memory device comprising:
      a storage device; and
      a controller device coupled to the storage device, comprising:
         a first comparator configured to compare the identifier to bits of a main memory address transmitted via the common bus;
         a second comparator configured to compare a portion of the identifier with a portion of the bits of the main memory address;
         a first select device coupled to the first and second comparators and configured to receive a first select signal that selects an output of the second comparator when the number of cache memory devices in the memory system is a second number and the first select signal is active; and
         a second select device configured to receive a second select signal that enables the cache memory device when a number of cache memory devices in the system is a first number and the second select signal is active.

2. The memory system of claim 1, wherein when the number of cache memory devices in the memory system is a third number, the first select signal and second select signal are inactive and an output of the first comparator is selected by the first select device, and wherein the output of the first comparator enables the cache memory device.

3. The memory system of claim 2, wherein the first number is two, the second number is one, and the third number is four.

4. The memory system of claim 1, wherein each of the plurality of cache memory devices further comprises an output driver circuit coupled to the storage device and configured to provide an output of a memory operation to the common bus.

5. The memory system of claim 4, wherein, when a cache memory device of the plurality of cache memory devices is not enabled, an output driver circuit of the cache memory device is disabled.

6. The memory system of claim 5 wherein the identifier indicates a position of the cache memory device on the common bus.

7. A method for enabling a cache memory device of a plurality of cache memory devices in a system to perform a memory access operation, comprising the steps of:

receiving a, static multi-bit identifier signal that identifies a cache memory device of the plurality of cache memory devices;

receiving bits of a main memory address;

comparing all of the bits of the, static multi-bit identifier signal with all of the bits of the main memory address to produce a first result;

comparing a number of bits of the, static multi-bit identifier signal with a same number of bits of the main memory address to produce a second result;

if the plurality of cache memory devices is a first number, selecting the first result using a select signal;

if the plurality of cache memory devices is a second number, selecting the second result using the select signal; and using a selected result to enable the cache memory device.

8. The method of claim 7, further comprising the step of using a single chip signal to enable the cache memory device when the plurality of cache memory devices is not the first number and not the second number.

9. The method of claim 8, wherein the first number is four and the second number is two.

10. The method of claim 9, wherein the steps of selecting the first result and the second result include the step of using a two-chip signal to select and wherein a state of the two-chip signal indicates whether the plurality of cache memory devices comprises four cache memory devices or two cache memory devices.

11. The method of claim 10, wherein the output of the multiplexer and the single chip signal are input to an OR gate, and wherein the output of the OR gate comprises a cache memory device select signal.

12. The method of claim 8, wherein the single chip signal enables the cache memory device when the plurality of cache memory devices comprises one cache memory device.

13. The method of claim 12, wherein the two chip signal is input to a select input of a multiplexor.

\* \* \* \* \*